United States Patent
Stoev et al.

(10) Patent No.: US 7,337,530 B1
(45) Date of Patent: Mar. 4, 2008

(54) METHOD FOR MANUFACTURING A SHIELDED POLE MAGNETIC HEAD FOR PERPENDICULAR RECORDING

(75) Inventors: Kroum S. Stoev, Pleasanton, CA (US); Francis H. Liu, Fremont, CA (US); Yugang Wang, Milpitas, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 11/699,777

(22) Filed: Jan. 30, 2007

Related U.S. Application Data

(62) Division of application No. 10/819,533, filed on Apr. 6, 2004, now Pat. No. 7,193,815.

(51) Int. Cl.
*G11B 5/147* (2006.01)

(52) U.S. Cl. ............... 29/603.07; 360/126; 29/603.12; 29/603.15; 29/603.17

(58) Field of Classification Search .............. 360/126, 360/234–234.3, 125; 29/603.07, 603.12, 29/603.15, 603.17
See application file for complete search history.

(56) References Cited

U.S. PATENT DOCUMENTS

| | | | |
|---|---|---|---|
| 6,842,313 B1 * | 1/2005 | Mallary | 360/319 |
| 6,954,340 B2 | 10/2005 | Shukh et al. | |
| 7,002,775 B2 | 2/2006 | Hsu et al. | |
| 7,031,121 B2 * | 4/2006 | Khera et al. | 360/317 |
| 7,054,106 B2 | 5/2006 | Kudo et al. | |
| 7,088,548 B2 | 8/2006 | Nishida et al. | |
| 7,119,988 B2 | 10/2006 | Lille | |
| 7,120,988 B2 * | 10/2006 | Le et al. | 29/603.07 |
| 7,193,815 B1 * | 3/2007 | Stoev et al. | 360/126 |
| 7,271,982 B2 * | 9/2007 | MacDonald et al. | 360/125 |

* cited by examiner

*Primary Examiner*—Angel Castro
*Assistant Examiner*—Christopher R. Magee

(57) ABSTRACT

A method of making a perpendicular magnetic recording head for use in a data storage device includes forming a first pole layer, a second pole layer, a third pole layer, and a shield layer of a write section. The first pole layer, second pole layer, third pole layer, and shield layer are formed without using a chemical mechanical polishing process. The method next includes concurrently trimming the shield layer and a write pole that is defined by the third pole layer to a predetermined track width. In the trimming step, the shield layer is used as a mask for the write pole.

14 Claims, 8 Drawing Sheets

METHOD FOR MANUFACTURING A SHIELDED POLE MAGNETIC HEAD FOR PERPENDICULAR RECORDING

CROSS REFERENCE TO RELATED APPLICATIONS

This application is a divisional of U.S. patent application Ser. No. 10/819,533, entitled SHIELDED POLE MAGNETIC HEAD FOR PERPENDICULAR RECORDING, filed Apr. 6, 2004, incorporated herein by reference.

FIELD OF THE INVENTION

The invention generally relates to data storage devices such as disk drive. More specifically, the present invention provides a novel type of shielded pole magnetic head design for perpendicular recording comprised of double reversed coils and a ring-head like structure above the recording pole, and that further incorporates a novel design feature in form of a shielding element having approximately the same width as the recording pole track width. This new type of perpendicular recording head provides a significant advantage over a conventional recording head by significantly reducing manufacturing complexity and cycle time.

BACKGROUND OF THE INVENTION

A conventional perpendicular recording head typically employs an inductive transducer positioned in close proximity to a magnetic medium. The inductive transducer is comprised of a plurality of pole and shield layers, a plurality of coils for generating a magnetic field, and a pole tip. The induced magnetic field during a write operation generates magnetic flux lines that traverse through the magnetic recording medium from the pole tip.

The efficiency of a perpendicular recording head depends on several factors that control the operation of the magnetic field, such as the write gap, the track width of the pole tip, and the throat height. Another such factor also depends on the shape of the third shield layer. Generally, the third shield layer is disposed at the air bearing surface (ABS) of the recording head, and is formed integrally with the top shield layer, that is also known as the fourth shield layer. In a conventional perpendicular recording head, the width of the third shield layer is relatively wide, and is substantially greater than the track width of the pole tip. Typically, the width of the third shield layer is on the order of 50 μm.

The disparity between the width of the third shield layer and the track width of the pole tip creates a number of problems for the conventional perpendicular recording head. As an example, because of the width of the third shield layer, plating seems to be the most suitable manufacturing process for creating the third shield layer. Plating process typically requires a high level of complexity towards achieving the maximum possible magnetic moment. As a result, other methods of generating higher moment, such as sputtering, may not be adequately used with the conventional perpendicular recording head employing a wide third shield layer.

Another problem associated with a wide third shield layer is the manufacturing complexity and high cycle time required for manufacturing the conventional perpendicular recording head at the wafer level. Generally, the pole tip width must first be defined by a complex topography on the wafer. The following step includes a planarization process. However, during planarization, pole tips and/or write gaps may be subjected to potential damage. As a result, the planarization process must be performed in a high degree of exactness, which significantly contributes to the cycle time of the head. Once the planarization step is completed, the third shield layer may be formed.

Yet another problem encountered with manufacturing a conventional perpendicular recording head employing a wide third shield layer lies in the fabrication of the pole tip. Typically, the pole tip ABS view is shaped as a trapezoid. In the conventional perpendicular recording head, the trapezoidal pole tip cross section has to be defined first, separately from the third shield layer. The process of defining the trapezoidal pole tip generally requires a separate pole trim process. However, during this process, there exists a possibility of track width variation and pole tip thickness variation when using a metal mask; and, when using an aluminum mask or a hard mask this poses another challenge in the removal of the mask. In either case, it would be relatively difficult to implement these two processes.

Therefore, what is needed is an improved shielded pole magnetic head design for perpendicular recording that includes a novel third shield layer design in order to overcome the current problems. The new third shield design would substantially reduce the manufacturing complexity, and would further enable the use of more efficient methods for depositing high moment materials such as sputtering. It would also be desirable to present an improved pole trim process that would result in improved track width uniformity of the write pole tips across the wafer.

SUMMARY OF THE INVENTION

The present invention can be regarded as a read/write head for use in a perpendicular magnetic recording head in a data storage system. The read/write head includes a write section that is comprised of a first pole layer, a second pole layer, a third pole layer, and a shield layer. The third pole layer defines a write pole tip, and the third pole layer and the shield layer are separated from each other to define a write gap therebetween. At least part of the shield layer has a generally uniform width, and wherein the write pole tip defines a track width that is substantially equal to the uniform width of the shield layer.

The present invention can also be regarded as a disk drive that includes a base; a spindle motor attached to the base; a disk positioned on the spindle motor; and a head stack assembly that is coupled to the base. The head stack assembly includes an actuator body; an actuator arm cantilevered from the actuator body; and a read/write head that is coupled to the actuator arm. The read/write head includes a write section that is comprised of a first pole layer, a second pole layer, a third pole layer, and a shield layer. The third pole layer defines a write pole tip, and the third pole layer and the shield layer are separated from each other to define a write gap therebetween. At least part of the shield layer has a generally uniform width, and wherein the write pole tip defines a track width that is substantially equal to the uniform width of the shield layer.

According to one embodiment the entire shield layer has a generally uniform width that is substantially equal to the track width. According to another embodiment, the shield layer includes a lower section and an upper section, wherein the lower section has a generally uniform width along its entire length, and wherein the upper section is wider than the lower section.

The present invention can also be regarded as a method of making a perpendicular magnetic recording head for use in a data storage device. The method includes the steps of forming a first pole layer, a second pole layer, a third pole layer, and a shield layer of a write section, without using a chemical mechanical polishing process. The shield layer and a write pole are concurrently trimmed, in a single step, to a predetermined track width, wherein the shield layer is used as a mask for the write pole.

Furthermore, the present invention can be regarded as a method of making a perpendicular magnetic recording head for use in a data storage device. The method includes the steps of forming a first pole layer, a second pole layer, a third pole layer, and a shield layer of a write section, without using a chemical mechanical polishing process. The shield layer and a write pole are concurrently trimmed, to a predetermined track width, wherein the lower portion of the shield layer is used as a mask for the write pole. A high moment material is deposited atop a write gap formed between the lower portion of the shield layer and the third pole layer, and then an upper portion of the shield layer, wherein the upper portion is wider than the lower portion of the shield layer.

DETAILED DESCRIPTION OF PREFERRED EMBODIMENTS

Figure 1:
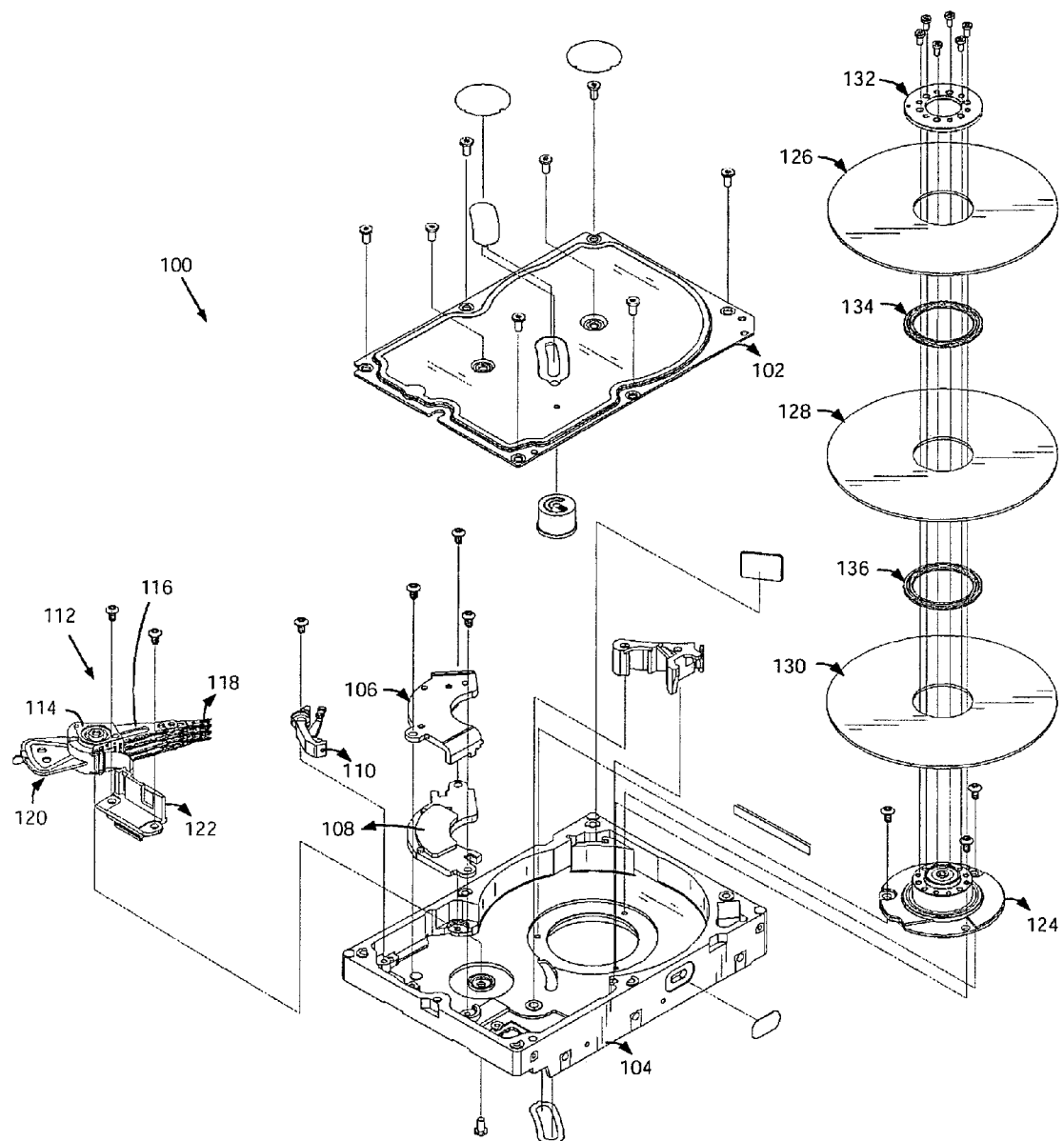
FIG. 1 is a fragmentary perspective view of a data storage device utilizing a read/write head of the present invention.

FIG. 1 illustrates a hard disk drive 100 in which an embodiment of the present invention may be used. An enclosure of the hard disk drive 100 comprises a cover 102 and a base 104. The enclosure is suitably sealed to provide a relatively contaminant-free interior for a head disk assembly (HDA) portion of the hard disk drive 100. The hard disk drive 100 also comprises a printed circuit board assembly (not shown) that is attached to base 104 and further comprises the circuitry for processing signals and controlling operations of the hard disk drive 100.

Within its interior, the hard disk drive 100 comprises a magnetic disk 126 having a recording surface typically on each side of the disk, and comprises a magnetic head or slider that may suitably be a magneto-resistive ("MR") head such as a GMR head. The GMR head has an MR element for reading stored data on a recording surface and an inductive element for writing data on the recording surface. The exemplary embodiment of the hard disk drive 100 illustrated in FIG. 1 comprises three magnetic disks 126, 128, and 130 providing six recording surfaces, and further comprises six magnetic heads.

Disk spacers such as spacers 134 and 136 are positioned between magnetic disks 126, 128, 130. A disk clamp 132 is used to clamp disks 126, 128, 130 on a spindle motor 124. In alternative embodiments, the hard disk drive 100 may comprise a different number of disks, such as one disk, two disks, and four disks and a corresponding number of magnetic heads for each embodiment. The hard disk drive 100 further comprises a magnetic latch 110 and a rotary actuator arrangement. The rotary actuator arrangement generally comprises a head stack assembly 112 and voice coil magnet ("VCM") assemblies 106 and 108. The spindle motor 124 causes each magnetic disk 126, 128, 130 positioned on the spindle motor 124 to spin, preferably at a constant angular velocity.

A rotary actuator arrangement provides for positioning a magnetic head over a selected area of a recording surface of a disk. Such a rotary actuator arrangement comprises a permanent-magnet arrangement generally including VCM assemblies 106, 108, and head stack assembly 112 coupled to base 104. A pivot bearing cartridge is installed in a bore of the head stack assembly 112 and comprises a stationary shaft secured to the enclosure to define an axis of rotation for the rotary actuator arrangement.

The head stack assembly 112 comprises a flex circuit assembly and a flex bracket 122. The head stack assembly 112 further comprises an actuator body 114, a plurality of actuator arms 116 cantilevered from the actuator body 114, a plurality of head gimbal assemblies 118 each respectively attached to an actuator arm 116, and a coil portion 120. The number of actuator arms 116 and head gimbal assemblies 118 is generally a function of the number of magnetic disks in a given hard disk drive 100.

Figure 2:
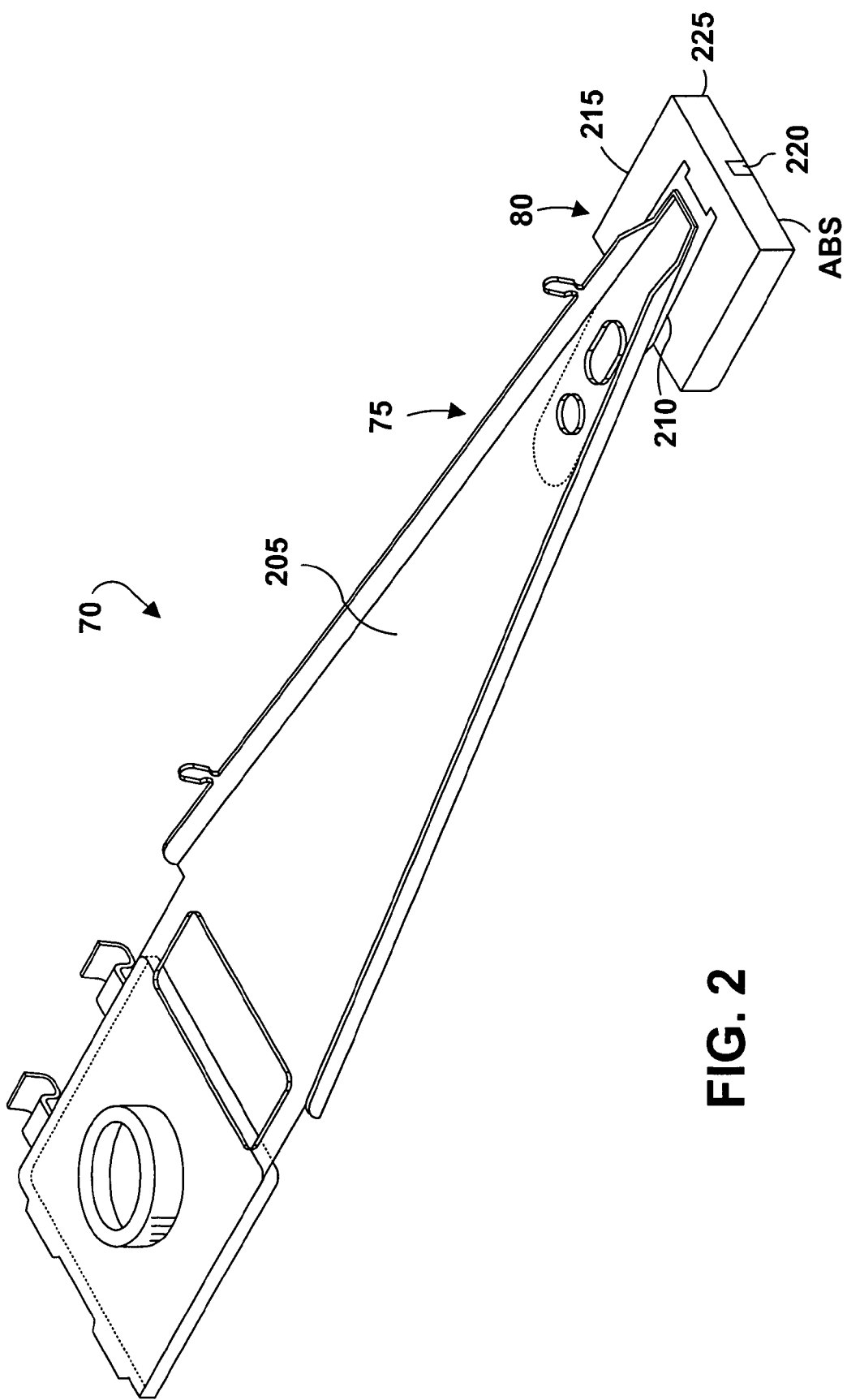
FIG. 2 is a perspective view of a head gimbal assembly comprised of a suspension, and a slider to which the read/write head of FIG. 1 is secured, for use in a head stack assembly.

Each of the head gimbal assemblies (HGA) 118 is secured to one of the actuator arms 116. As illustrated in FIG. 2, HGA 118 is comprised of a suspension 205 and a read/write head 210. The suspension 205 comprises a resilient load beam 215 and a flexure 220 to which the read/write head 210 is secured.

The read/write head 210 comprises a slider 225 secured to the free end of the resilient load beam 215 by means of flexure 220 and a read/write element 230 supported by slider 225. In the example illustrated in FIG. 2, the read/write element 230 is secured to the trailing edge 235 of slider 225. Slider 225 can be any conventional or available slider. In another embodiment, more than one read/write element 230 can be secured to the trailing edge 235 or other side(s) of slider 225. The read/write element 230 comprises a write element and a read element.

Figure 3:
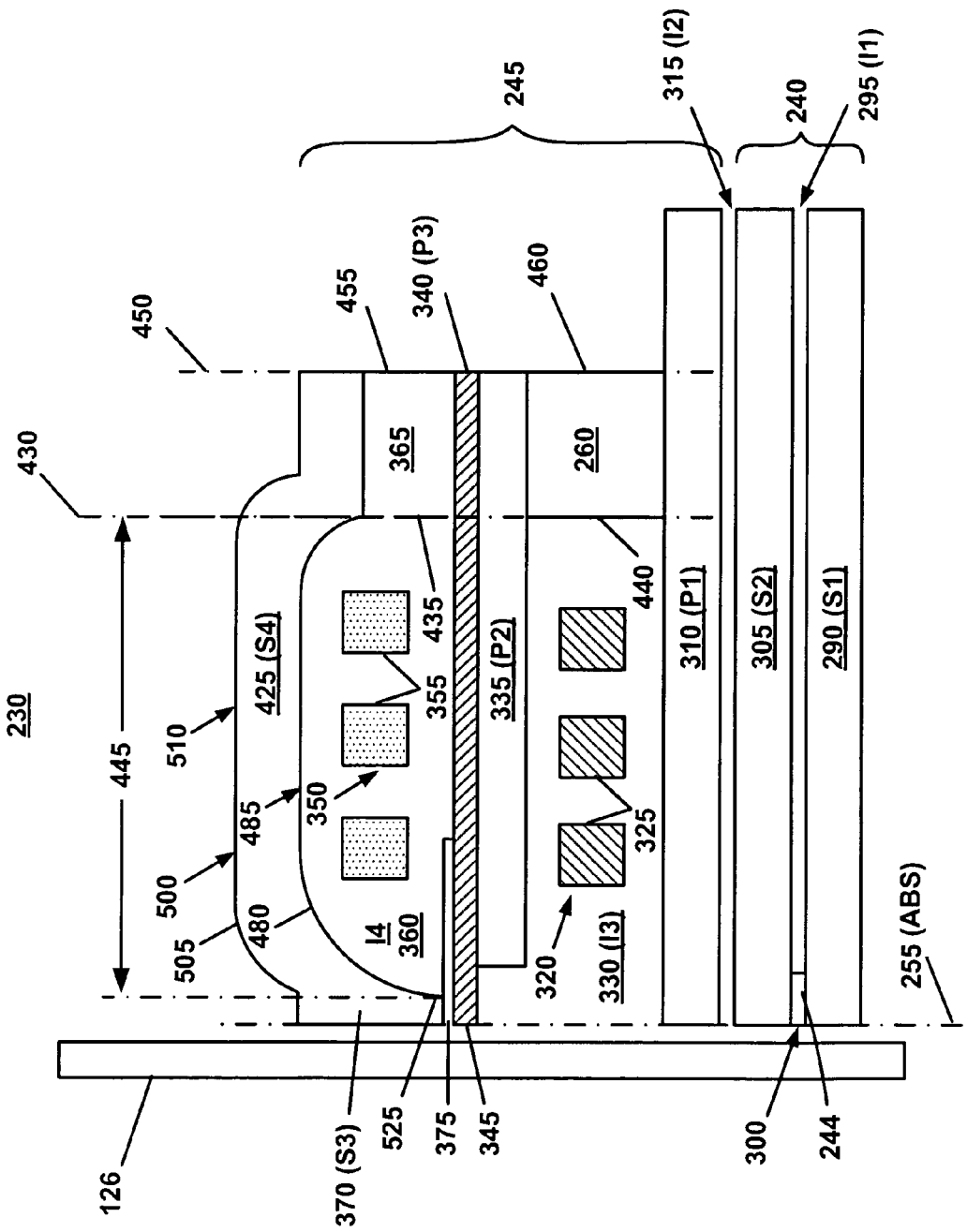
FIG. 3 is a cross-sectional view, taken perpendicularly to the ABS, of a read/write element comprising a third shield layer and a fourth shield layer made according to a preferred embodiment of the present invention, shown in close proximity to a magnetic medium.

The details of the read/write element 230 will now be described with reference to FIGS. 3-6. FIG. 3 illustrates the read/write element 230 as integrating a read section 240 and a write section 245 positioned in proximity to the data medium 126. The surface of the read/write element 230 in closest proximity to the surface of the medium 126 defines the air bearing surface (ABS) 255 of the read/write element 230.

The read section 240 is formed of a first shield (S1) layer 290 preferably made of a material that is both magnetically and electrically conductive. For example, the S1 layer 290 can have a nickel-iron (NiFe) composition, such as Permalloy, or a ferromagnetic composition with high permeability. The S1 layer 290 has a thickness of approximately about 2 μm and one of its distal ends terminating at the ABS 255.

A first insulating (I1) layer 295 is formed over substantially the entire surface of the S1 layer 290 to define a non-magnetic, transducing read gap 300. The I1 layer 295 can be made of any suitable material, for example alumina ($Al_2O_3$), aluminum oxide, or silicon nitride.

The read section 240 also includes a read sensor 244 that is formed within the I1 layer 295. The read sensor 244 can be any suitable sensor that utilizes a change in resistance caused by a change in magnetic field to sense that field, which may be measured as a change in current or voltage across the sensor, including anisotropic magnetoresistive (AMR) sensors, spin-valve (SV) sensors, spin-tunneling (ST) sensors, a giant magnetoresistive (GMR) sensors, and colossal magnetoresistive (CMR) sensors. Other electromagnetic sensors, such as optical sensors, can alternatively be employed to sense magnetic fields from the medium.

The read section 240 further includes a second shield (S2) layer 305 that is made of an electrically and magnetically conductive material, which may be similar or equivalent to that of the S1 layer 290. The S2 layer 305 is formed over substantially the entire surface of the I1 layer 295 extending from the ABS 255, and has a thickness of approximately 1 μm. A read circuit is connected to the S1 layer 290 and the S2 layer 305, such that during a read mode the read circuit sends a sensing electric current, $I_R$, through the read sensor and the S2 layer 305.

The write section 245 comprises a first pole (P1) layer 310 that is formed substantially over the entire surface of the S2 layer 305. The P1 layer 310 is preferably made of a material that is both magnetically and electrically conductive such as Permalloy or a ferromagnetic composition with high permeability. The P1 layer 310 has a thickness of approximately 1 μm and extends lengthwise from the ABS 255.

A second insulating (I2) layer 315 is disposed between the P1 layer 310 and the S2 layer 305. The I2 layer 315 is typically made of any suitable material such as alumina ($Al_2O_3$), aluminum oxide, or silicon nitride.

A first, double reversal coil layer 320, that is made of a plurality of write coil elements 325, is deposited above the P1 layer 310 to form part of the write section 245. The write coil elements 325 are formed within a third insulating (I3) layer 330.

The third insulating (I3) layer 330 adjoins a center magnetic post 260 that is remotely displaced relative to the ABS 255. The write coil elements 325 are generally wound helically around the center magnetic post 260, and carry an electric current that flows in a direction out of the plane of the page.

The write section 245 further includes a second pole (P2) layer 335 that is disposed above the coil layer 320 and the center magnetic post 260. The height of the center magnetic post 260, which defines the spacing between the P1 layer 310 and the P2 layer 335, is approximately 2.5 μm.

The P2 layer 335 has a thickness of approximately 1 μm, and is made of a magnetically conductive material, that is, for example, similar or equivalent to that of the S1 layer 290 and the P1 layer 310.

The write section 245 further includes a third pole (P3) layer 340 that is formed atop the P2 layer 335, and that terminates at the ABS 255 in a write pole tip 345. The P3 layer 340 is typically made of hot seed or high moment material with a magnetic field strength of approximately 2.4 T.

Figure 4:
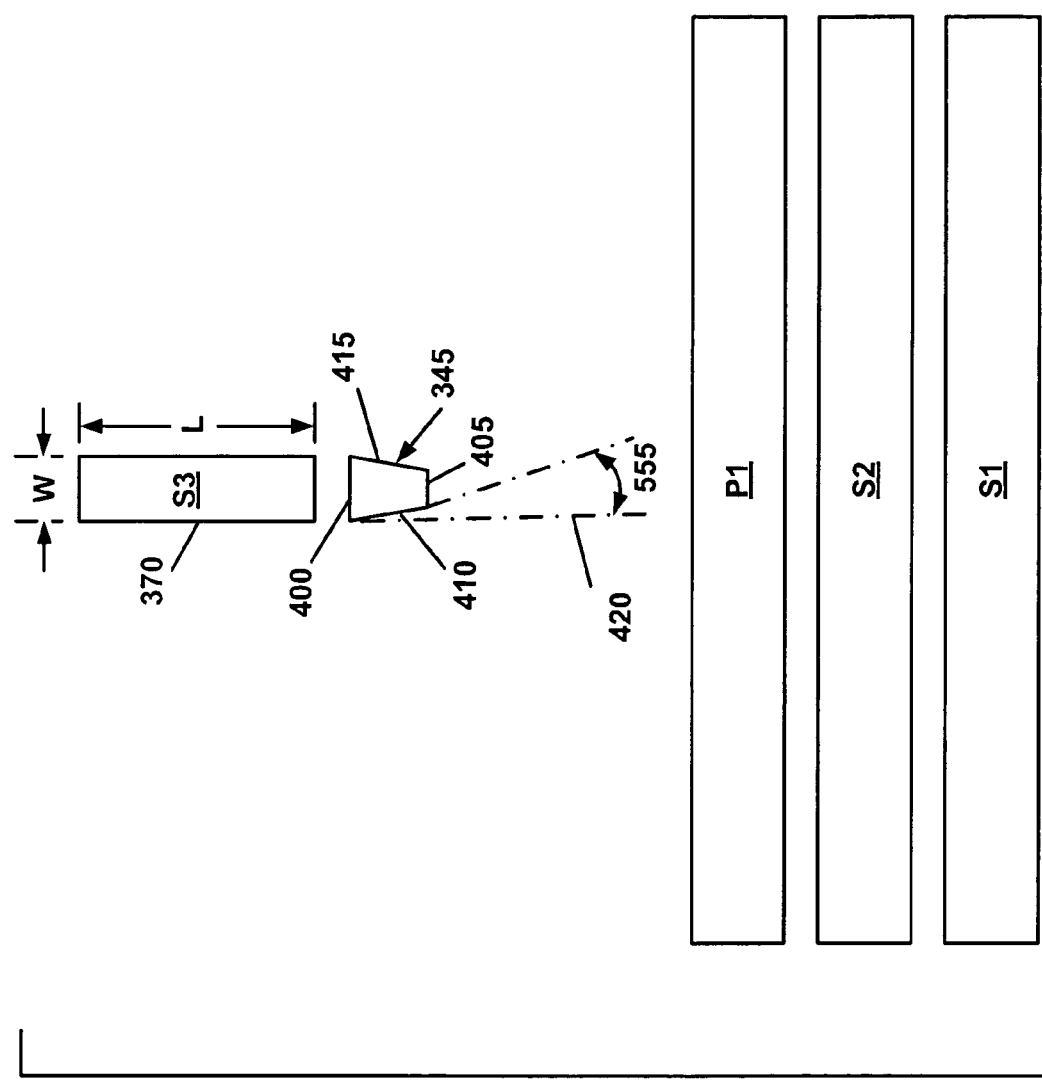
FIG. 4 is a partial ABS view of the read/write element of FIG. 3, illustrating a novel feature of the present invention whereby the shield width is substantially equal to the track width of the write pole.
Figure 6:
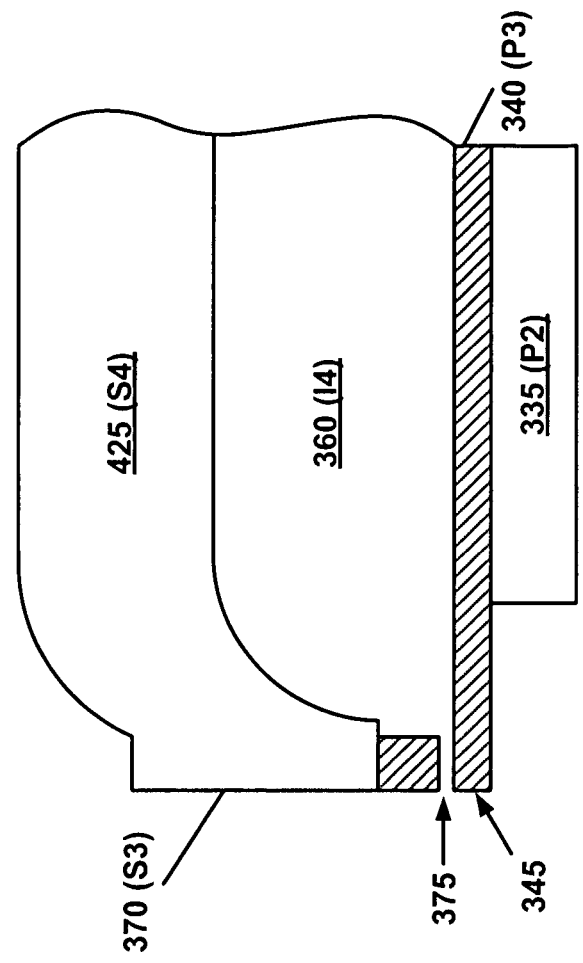
FIG. 6 is a cross-sectional view of a read/write element of FIG. 2, illustrating a hot seed section made according to an alternative embodiment of the present invention.

With reference to FIG. 4, the write pole tip 345 has a generally trapezoidally shaped section, with a height of, for example, approximately 0.25 μm or less. The longer base 400 of the pole tip 345 defines a track width that is, for example, approximately 0.20 μm or less.

The two bases 400 and 405 of the pole tip 345 are connected by two angular sides 410 and 415 that define a trapezoid angle 555 of approximately 5 degrees relative to an axis 420 perpendicular to the two bases 400 and 405. The trapezoid angle is designed to provide a good skew angle performance in the drive.

With further reference to FIG. 3, a second double reversal coil layer 350 comprising a plurality of write coils 355 is deposited above the P3 layer 340, to form part of the write section 245. The write coils 355 are formed within a fourth insulating (I4) layer 360 that adjoins another center magnetic post 365 which is remotely disposed relative to the ABS 255.

The write coils 355 are helically wound around the center magnetic post 365, and carry an electric current that flows in a direction into the plane of the page. Collectively, the double reversal coil layers 320 and 350 present numerous advantages such as a stronger applied magnetic field between, and a reduced or cancelled magnetic field leading or trailing the coil layers 320 and 350, as well as a reduction in coil inductance and amplification of stray signals due to an antenna effect.

With further reference to FIG. 3, the P3 layer 340 is formed over, and is separated from a pedestal or third shield (S3) layer 370 to define a write gap 375 therewith. The write gap 375 can be made of any suitable material, for example alumina ($Al_2O_3$), aluminum oxide, or silicon nitride.

A write circuit is connected to the double reversal coil layers 320 and 350. During a write mode, the write circuit transmits an electrical current, $I_W$, to induce a flux flow through the write gap 375. Changes in the flux flow across the write gap 375 produce different magnetic orientations of vertical magnetized regions or domains in the medium 126 during a write operation.

Figure 5:
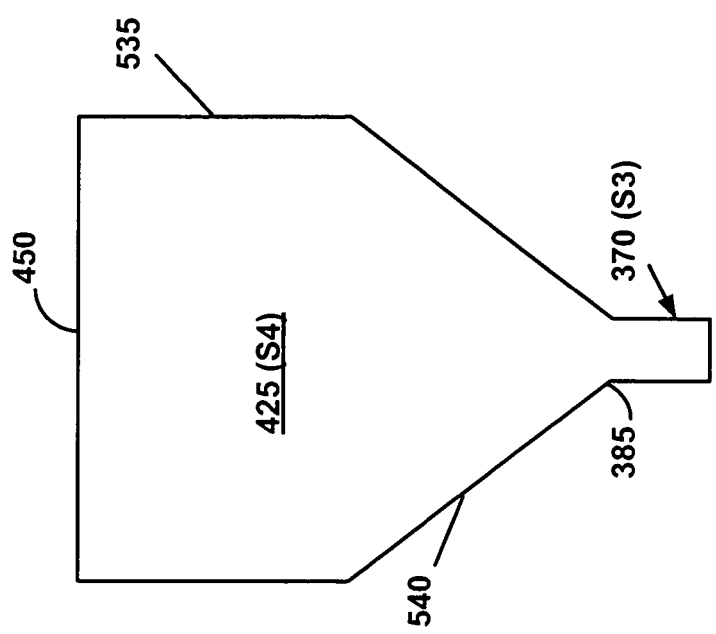
FIG. 5 is a top view of the fourth shield layer of FIG. 3.

With further reference to FIG. 5, the S3 layer 370 extends from the ABS 255 to a zero throat 385 and spans a length L. A fourth shield (S4) layer 425 is connected to the S3 layer 370, and covers the I4 layer 360 and the center magnetic post 365. The S4 layer 425 extends by a yoke length 445, as shown in FIG. 3, from the throat height 385 to a back plane 430 that is coplanar with forward facing surfaces 435 and 440 of the center magnetic posts 365 and 260, respectively. The S4 layer 425 further extends rearward and terminates at a back plane 450 that defines the backward facing surfaces 455 and 460 of the center magnetic posts 365 and 260, respectively.

With reference to FIG. 5, the S4 layer 425 is generally shaped as a compound figure comprising a rectangular section 535 and a taper section 540. The rectangular section 535, and adjoins the taper section 540 that extends forward and terminates in the S3 layer 370. In one embodiment, the S3 layer 370 and S4 layer 425 can be integrally formed. Alternatively, the S3 layer 370 can also be formed separately from the S4 layer 425.

A distinctive feature of the present invention is depicted in FIG. 4 which illustrates the S3 layer 370 as having a constant width, W, that is substantially equal to the longer base 400 of the write pole tip 345, to within a variation that may range between approximately 10% to 50%.

The width W of the S3 layer 370 may be established during a pole trim process whereby the write pole tip 345 and the S3 layer 370 are trimmed concurrently, in a single step. According to the present invention, the concept of having the width W of the S3 layer 370 substantially the same as the longer base 400 of the write pole tip 345 provides several benefits that have yet to be attained by conventional designs. One such important benefit is a significant reduction in the manufacturing complexity and cycle time resulting from a single pole trim process.

In contrast, in a conventional recording head, the S3 layer has a substantially greater width, for example on the order of 50 μm or more, than the track width W of the write pole tip 345. In addition, the process of forming the S3 layer in a conventional head is performed separately from the pole trim process, causing a high degree of manufacturing complexity.

Typically, in a conventional recording head, the track width of the write pole tip is initially defined by a complex topography on the wafer. A planarization is then followed, but sometimes may result in damage to the write pole tip and/or the write gap. Next, the S3 layer is deposited by plating and then shaped by chemical mechanical polishing. Furthermore, in a conventional recording head, the trapezoidal definition of the write pole tip also must be done in a separate process that tends to deteriorate the track width uniformity across the wafer.

FIGS. 7 through 12 illustrate a manufacturing process according to various embodiments of the present invention. Common to these embodiments, the read/write element 230 is formed from the S1 layer 290 to the P2 layer 335 by any suitable or available process, such as plating, chemical mechanical polishing, or similar other processes.

Figure 7:
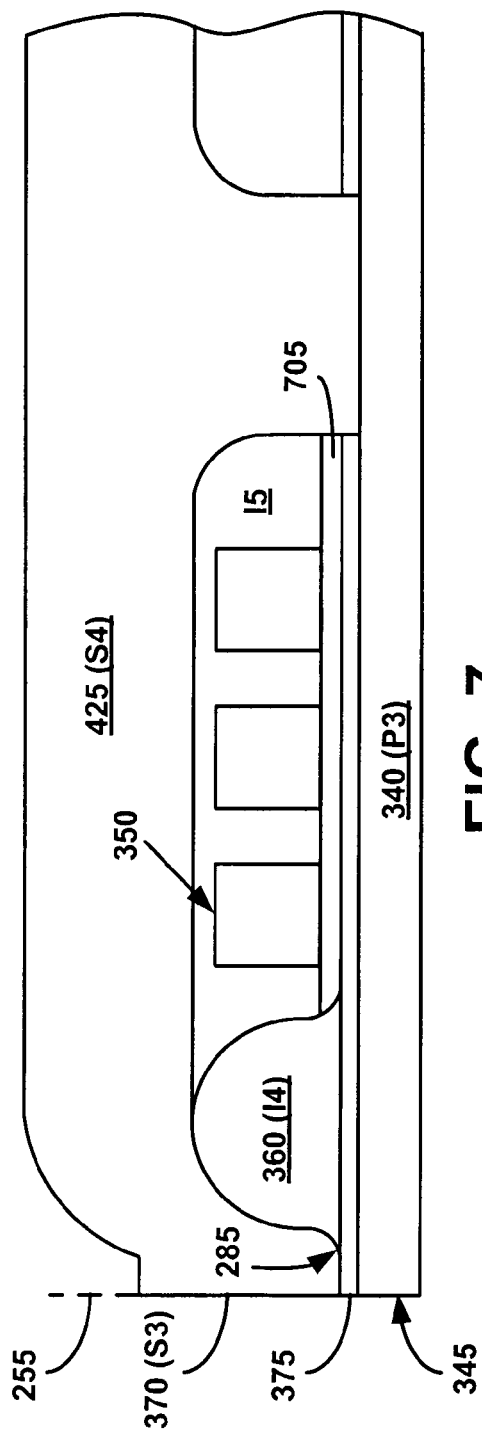
FIG. 7 is a cross-sectional view of the read/write element of FIG. 3, illustrating a first manufacturing process according to the present invention.
Figure 8:
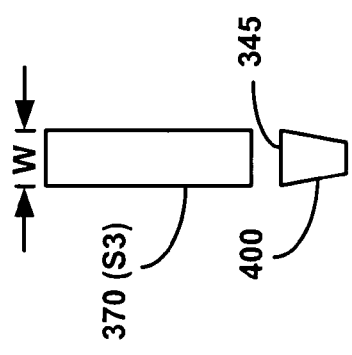
FIG. 8 is an ABS view of a pole tip region of the read/write element made using a pole trim step according to the process of FIG. 7.

According to one embodiment that is illustrated in FIGS. 7 and 8, after the P2 layer 335 is formed preferably by plating, a hot seed or high moment material is sputtered thereon to form the P3 layer 340 that includes the write pole tip 345. Next, the write gap 375 is formed, preferably by a deposition process, using any suitable material, such as $Al_2O_3$, onto the P3 layer 340.

An insulating region I4 360 is then formed atop a portion of the write gap 375 using any suitable insulating material, such as $Al_2O_3$. The insulating region I4 360 is generally shaped as a curved surface with a cross-sectional bell shape. The insulating region I4 360 is recessed from the ABS 255 by a distance substantially equal to the zero throat 385.

In the following step, the double reversal coil layer 350 is formed on an insulation layer 705 that is formed over the write gap 375. Another insulating layer I5 layer (which is a photoresist layer) covers the double reversal coil layer 350.

The S3 layer 370 and the S4 layer 425 are then formed concurrently so that the S3 layer 370 becomes integral with the S4 layer 425, preferably by a plating process, wherein a material that is both magnetically and electrically conductive, such as Permalloy or a ferromagnetic composition with high permeability, is deposited to substantially cover the insulating region I4 360 and the I5 layer 360.

With reference to FIG. 8 that illustrates the ABS view, the S3 layer 370 and the write pole tip 345 are then concurrently trimmed define the width W of the S3 layer 370 and the track width of the write pole tip 345, so that the width W and the track width (longer base 400 of the pole tip 345) have substantially the same or similar dimension. The trapezoid angle 555 (FIG. 4) of the write pole tip 345 is also defined during the concurrent pole trim process, by allowing a portion of the S3 layer 370 in proximity to the write gap 375 to become a hard mask for trimming.

Figure 9:
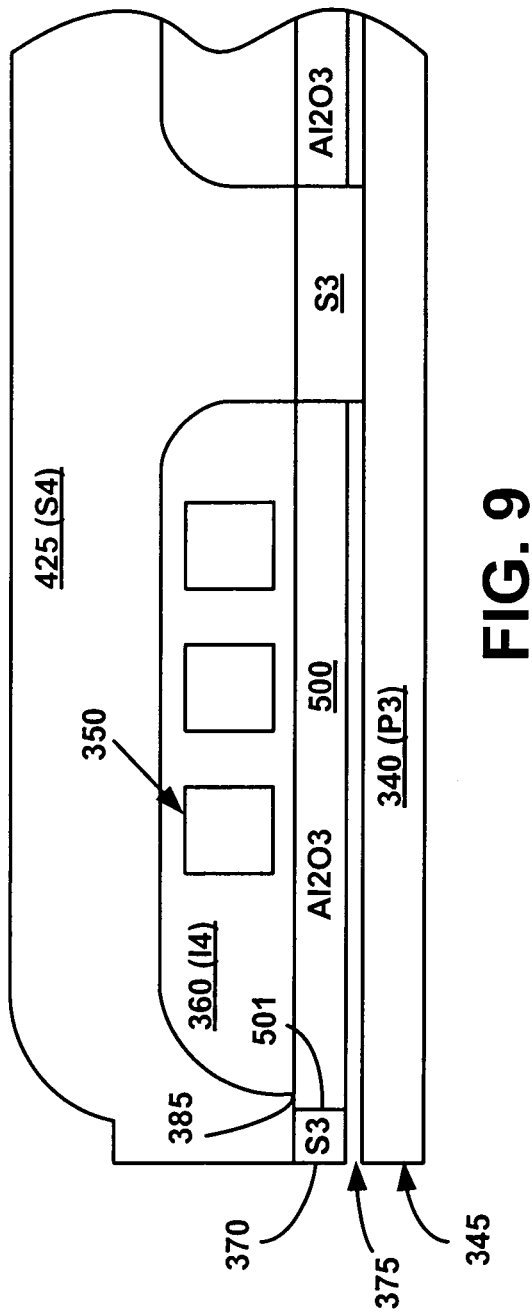
FIG. 9 is a cross-sectional view of the read/write element of FIG. 6, illustrating another manufacturing process according to the present invention.
Figure 10:
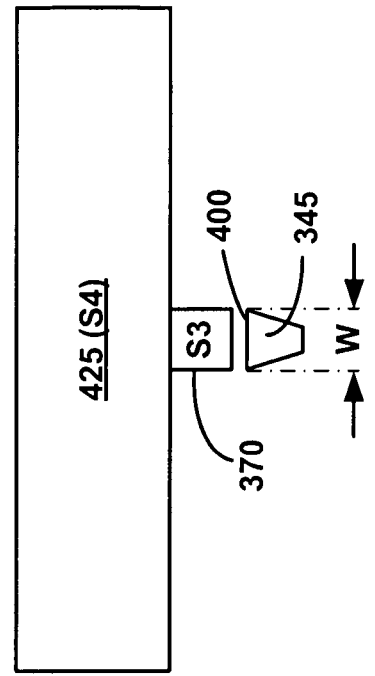
FIG. 10 is an ABS view of a pole tip region of the read/write element made using a pole trim step according to the process of FIG. 9.

FIGS. 9 and 10 illustrate an alternative fabrication embodiment according to which, following the formation of the P2 layer 335 by for example, a plating process, a hot seed or high moment material is sputtered on the P2 layer 335 to form the P3 layer 340. The P3 layer 340 includes the write pole tip 345.

Next, the write gap 375 is formed preferably by a deposition process using any suitable material such as $Al_2O_3$ onto the P3 layer 340. In the following step, an insulating layer 500 is formed, preferably using a plating process, wherein a suitable material such as $Al_2O_3$ is deposited atop the write gap 375. One end 501 of the insulating layer 500 is recessed from the ABS 255 by a distance that is substantially equal to the zero throat height.

In the next step, a hot seed or high moment material with a magnetic field strength of approximately 2.4T is deposited in the region adjacent to the ABS 255 and the insulating layer 500 by a suitable process, preferably plating or sputtering, to form the roughly shaped S3 layer 370 with substantially the same thickness as the insulating layer 500. A chemical milling process is then followed to define the final shape of the S3 layer 370.

With reference to the ABS view of FIG. 10, the S3 layer 370 and the write pole tip 345 are concurrently trimmed to define the width W of the S3 layer 370 and the track width of the write pole tip 345, so that the width W and the track width (longer base 400 of the pole tip 345) are substantially the same or similar. The trapezoid angle 555 of the write pole tip 345 is also defined during this pole trim process by allowing a portion of the S3 layer 370 in proximity to the write gap 375 to become a hard mask for trimming.

Thereafter, the double reversal coil layer 350 is placed on the insulating layer 500, and the I4 layer 360 is then filled in to cover the double reversal coil layer 350. In the final step, the S4 layer 425 is formed, preferably by a plating process to substantially cover the I4 layer 360 and the S3 layer 370 with a material that is both magnetically and electrically conductive such as Permalloy or a ferromagnetic composition with high permeability. As illustrated in FIG. 10, the S4 layer 425 is wider than the width W of the S3 layer 370.

Figure 11:
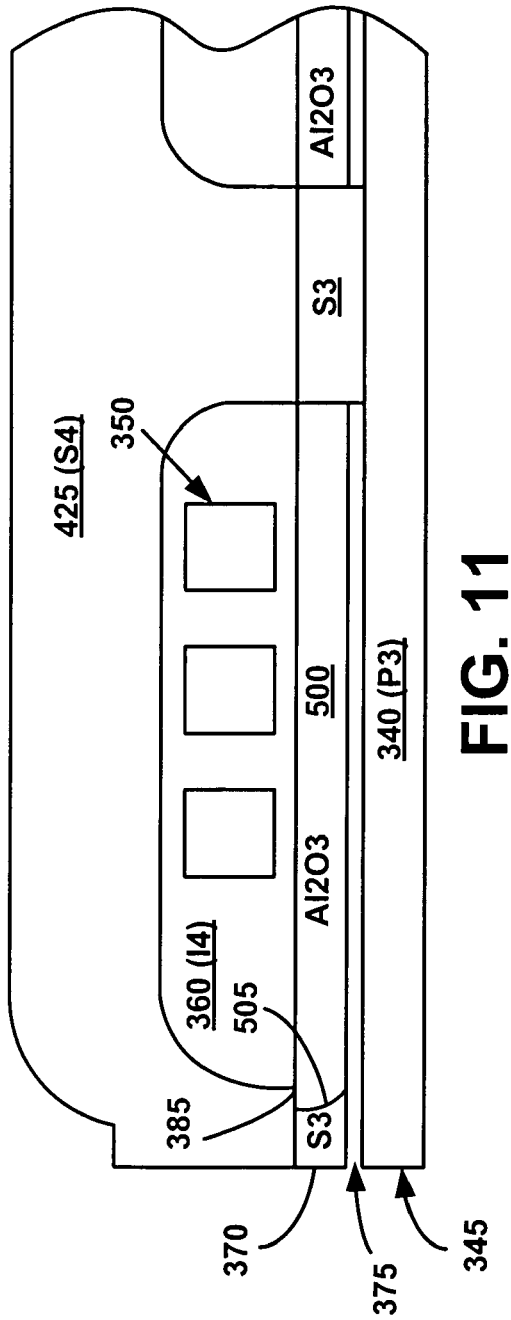
FIG. 11 is a cross-sectional view of the read/write element of FIG. 6, illustrating yet another manufacturing process according to the present invention.
Figure 12:
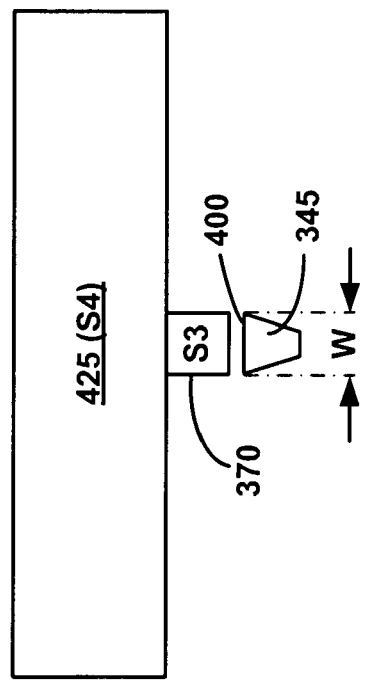
FIG. 12 is an ABS view of a pole tip region of the read/write element made using a pole trim step according to the process of FIG. 11.

With reference to FIGS. 11 and 12, they illustrate another alternative embodiment according to which the P3 layer 340, which includes the write pole tip 345, and the write gap 375 are formed in a substantially similar process as the aforementioned process in alternative embodiment illustrated in FIGS. 9 and 10. Thereafter, the S3 layer 370 is formed, preferably by a plating process wherein a material that is both magnetically and electrically conductive such as Permalloy or a ferromagnetic composition with high permeability is deposited on top of the write gap 375 at the ABS 255.

The S3 layer 370 is roughly shaped with a curved surface 505. A chemical milling process is then followed to define the final shape of the S3 layer 370 and to define the throat height. The insulating layer 500 is then filled in the milled region to substantially the same thickness as the S3 layer 370, with a magnetically insulating material such as $Al_2O_3$. Next, a chemical mechanical polishing process is performed on the S3 layer 370 to remove excess material from the insulating layer 500.

With reference to the ABS view of FIG. 12, the S3 layer 370 and the write pole tip 345 are then concurrently trimmed to define the width W of the S3 layer 370 and the track width of the write pole tip 345, so that the width W and the track width (longer base 400 of the pole tip 345) are substantially the same or similar. The trapezoid angle 555 of the write pole tip 345 is also defined during this pole trim process by allowing a portion of the S3 layer 370 in proximity to the write gap 375 to become a hard mask for trimming.

Subsequently, the double reversal coil layer 350 is formed on the insulating layer 500, and the 14 layer 360 is then filled in to cover the double reversal coil layer 350. The S4 layer 425 is then formed, preferably by a plating process, to substantially cover the 14 layer 360 and the S3 layer 370 with a material that is both magnetically and electrically conductive such as Permalloy or a ferromagnetic composition with high permeability. As illustrated in FIG. 12, the S4 layer 425 is wider than the width W of the S3 layer 370.

What is claimed is:

1. A method of making a perpendicular magnetic recording head for use in a data storage device, comprising:
   forming a first pole layer, a second pole layer, a third pole layer, and a shield layer of a write section, without using a chemical mechanical polishing process; and
   then concurrently trimming the shield layer and a write pole that is defined by the third pole layer, to a predetermined track width, wherein the shield layer is used as a mask for the write pole.

2. The method of claim 1, wherein the write pole tip has a generally trapezoidally shaped section.

3. The method of claim 2, wherein the trapezoidally shaped section of the write pole tip has a long base and a short base.

4. The method of claim 3, wherein the long base of the trapezoidally shaped section of the write pole tip is disposed in closer proximity to the shield layer than the short base.

5. The method of claim 4, wherein the long base of the trapezoidally shaped section of the write pole tip defines the track width.

6. The method of claim 1, wherein the shield layer includes a lower section and an upper section;
   wherein the lower section has a generally uniform width along its entire length; and
   wherein the upper section is wider than the lower section.

7. The method of claim 6, wherein the upper section has a generally uniform width along its entire length.

8. A method of making a perpendicular magnetic recording head for use in a data storage device, comprising:
   forming a first pole layer, a second pole layer, a third pole layer, and a shield layer of a write section, without using a chemical mechanical polishing process;
   concurrently trimming the shield layer and a write pole that is defined by the third pole layer, to a predetermined track width, wherein the lower portion of the shield layer is used as a mask for the write pole;
   depositing a high moment material atop a write gap formed between the lower portion of the shield layer and the third pole layer; and
   forming an upper portion of the shield layer.

9. The method of claim 8, wherein the write pole tip has a generally trapezoidally shaped section.

10. The method of claim 9, wherein the trapezoidally shaped section of the write pole tip has a long base and a short base.

11. The method of claim 10, wherein the long base of the trapezoidally shaped section of the write pole tip is disposed in closer proximity to the shield layer than the short base.

12. The method of claim 11, wherein the long base of the trapezoidally shaped section of the write pole tip defines the track width.

13. The method of claim 8, wherein the shield layer includes a lower section and an upper section;
   wherein the lower section has a generally uniform width along its entire length; and
   wherein the upper section is wider than the lower section.

14. The method of claim 13, wherein the upper section has a generally uniform width along its entire length.

* * * * *